Patented Mar. 5, 1935

1,993,668

UNITED STATES PATENT OFFICE 1,993,668

MANUFACTURE OF DIBENZANTHRONE COMPOUNDS

Edward T. Howell, Milwaukee, Wis., assignor to E. I. du Pont de Nemours & Company, Wilmington, Del., a corporation of Delaware No Drawing. Application May 5, 1933, Serial No. 669,558

27 Claims. (Cl. 260—61)

This invention relates to the manufacture of dibenzanthrone compounds by the alkaline fusion of benzanthrone or its derivatives, and constitutes a further development of the invention described and claimed in my copending application Ser. No. 648,979.

The alkaline fusion of benzanthrone to dibenzanthrone has received considerable study in the art. The earliest processes as suggested by Bally (U. S. Patent 818,992) involved the heating of benzanthrone in melted caustic potash at a temperature of 180 to 230° C.; or the fusion of a benzanthrone derivative, for instance, chlorobenzanthrone or benzo-benzanthrone in melts of equal parts of caustic potash and absolute alcohol, or caustic potash and sodium acetate at temperatures about 150 to 200° C. (U. S. Patent 818,336; German Patent 185,223). Later various modifications were applied to these original processes, most of them involving the addition of various diluents or assistants to the fusion mixture. Among these, it has been claimed that the addition of reducing agents such as dextrine, dextrose, fructose, and various aldehydes produce beneficial results (U. S. Patents 1,478,027, 1,844,381, 1,845,246 and 1,849,826). Nevertheless, the above processes leave much to be improved as regards quality of the product. Although the crude dyestuff in many cases corresponds practically to the theoretical yield expected from the initial quantity of benzanthrone, the product is invariably contaminated with isodibenzanthrone, as well as up to 40% vat insoluble impurity, making the tinctorial value low. The portion that is vattable frequently contains enough isodibenzanthrone to seriously affect the shade of the dyeing or to render the product unfit for purposes intended.

These processes are in substance two-stage processes. At first 2,2'-dibenzanthronyl is formed (Houben, "Das Anthracene und die Anthrachinon", pages 774–5). The formation of this intermediate is particularly favored where the benzanthrone, a diluent, and caustic alkali, or alcoholic-alkali, are mixed at moderate temperatures and heated to the optimum fusion temperature. (The latter is generally around 180 to 230° C.) At the higher temperature, this intermediate ring-closes to produce dibenzanthrone in leuco form, which upon aeration gives the dyestuff. It appears, however, that not all of the intermediate 2,2'-dibenzanthronyl is so ring-closed. Under the influence of the higher temperature, part of the intermediate is disrupted and recombined in a different manner to give isodibenzanthrone and other undesirable by-products. (See Example 11 of British Patent 303,454.)

This invention has as an object the manufacture of dibenzanthrone of such a purity as to be essentially free of isodibenzanthrone and impurities of a non-vattable nature. A further object is to obtain dibenzanthrone from benzanthrone in substantially quantitative yield and of a tinctorial power exceeding that of crude dibenzanthrone obtained by previously disclosed processes. Other and further important objects of this invention will appear as the description proceeds.

These objects are accomplished, according to my invention, by fusing benzanthrone in alcoholic-caustic potash in the presence of a metal nitrite and an inhibitor such as an alkali metal salt of a lower fatty acid, and preferably in the presence of an indifferent diluent.

The process of my present invention is thus similar in all respects to the process described and claimed in my copending application Ser. No. 648,979, except that in lieu of the oxidizing agents specifically mentioned in said copending application, I prefer now to use an alkali-metal nitrite, or its equivalent of other nitrites.

The advantages of my novel oxidizing agent over those mentioned in the previous application are, first of all, reduced hazard, greater facility of control of the reaction, and a saving in manual labor and materials in the recovery step. Thus, sodium or potassium nitrite, for instance, do not carry with them the hazard of explosion attendant upon the use of potassium chlorate or nitrate. In the recovery step, when the fusion mass is diluted with water the excess nitrite or its reduction products go into solution and are filtered off, whereas cupric oxide, manganese dioxide, or potassium chromate give rise to insoluble inorganic compounds which must be extracted from the dyestuff mass with acid. The nitrites also appear to give equally good results whether added at the beginning of the reaction or after the other ingredients have been mixed together and heated for some time, which is not true of some of the oxidizing agents previously mentioned.

Another advantage, however, of quite unforeseen nature, is a remarkable further increase in tinctorial yield when a metallic nitrite is used as oxidizing agent. This increase in tinctorial yield is particularly observable when the dibenzanthrone thus produced is converted into "jade green" (dimethoxy - dibenzanthrone) by the known process of oxidation, partial reduction and methylation. The tinctorial yield of jade green is perceptibly higher in the product produced by the aid of sodium nitrite than in the product involving the use of potassium chlorate. Alkali metal nitrites thus appear to posses a greater efficiency as compared with other oxidizing agents as far as improving the quality of the dyestuff produced is concerned.

The product obtained is generally quantitative in yield and free of either vat insoluble impurities or isodibenzanthrone. The tinctorial yield is 40 to 60% greater than that obtained by the direct fusion of benzanthrone, and is undoubtedly due both to the increased yield of dibenzanthrone and to its higher purity which causes its dyeings to be of true shade and improved brightness. The nitrite acts as an oxidizing agent, as shown by the ammonia gas liberated from the fusion, and since an oxidizing agent is the direct opposite of a reducing agent, the above result is truly astonishing in view of the practice in the art above referred to.

The preferred nitrites are those of the alkali-metal class such as sodium or potassium nitrite. These may be added either before the reaction is begun or after it has proceeded for some time. For best results it should be added to the melt at a temperature between 100 and 160° C.

Inert diluents may be added, if desired, for instance, naphthalene, alpha-methyl-naphthalene, diphenyl, diphenyl oxide, kerosene, and the like.

The theory of the reaction is not quite understood. As stated above, it appears that 2,2'-dibenzanthronyl, more correctly its leuco form, is first formed in the reaction. The presence of the nitrite apparently assists its conversion to dibenzanthrone (leuco form) without giving it the opportunity to decompose, under the influence of the higher temperature, into intermediate products which otherwise lead eventually to isodibenzanthrone or to vat-insoluble by-products. The latter effect is particularly brought out by the use of an inhibitor such as potassium acetate, which seems to aid in regulating the rate of reaction whereby to prevent the setting-in of undesirable side reactions prior to the time that maximum temperature is reached. Any other means of controlling the rate of reaction during the first stage of the process without, however, cooling to a point where condensation will not occur at all, would appear to give equally good results. For instance, sodium acetate, potassium propionate, or other alkali metal salts of lower fatty acids may be used to accomplish the same purpose.

The quantity of nitrite required for improvement may vary within quite wide limits. For best results it should not be less than 1 mole of nitrite per mole of benzanthrone and not more than 4. I have also found it advantageous to use a lower alcohol-potash ratio than used heretofore in similar fusions in the art. Generally speaking, the ratio of alcohol to potash should not exceed 1:3 by weight.

Without limiting my invention to any particular procedure, the following examples are given to illustrate my preferred mode of operation. Parts given are by weight.

*Example 1*

The fusion is carried out in a closed vessel equipped with a closely fitting agitator. A melt of 43 parts of methanol, 15 parts of fused potassium acetate and 175 parts of caustic potash is heated to 140° C. and diluted with 250 parts of molten naphthalene. After adjusting the temperature to 155° C., 22.5 parts of sodium nitrite are added, followed by 50 parts of purified benzanthrone (M. P. 168–170° C.). The temperature is then raised to the refluxing point (215° C.) and maintained at that point with continued stirring for ¾ hour. After cooling to about 150° C. the naphthalene is removed by applying vacuum to the fusion vessel and distilling under diminished pressure. The residue is diluted with water, aerated, filtered, washed and dried. A quantitative yield of product is thus obtained which is free of isodibenzanthrone and non-vattable impurities, dissolves in concentrated sulfuric acid with a red-violet color, and gives dyeings on cotton of the shade characteristic of pure dibenzanthrone.

In this example, the amount of sodium nitrite may be increased to 37.5 parts, but should not be lower than 15–20 parts, in view of the risk of obtaining an inferior product. The length of time of heating at 215° C. may sometimes be increased with advantage, but usually does not have to exceed 1 hour.

*Example 2*

A melt made up of 50 parts of methanol, 200 parts of caustic potash and 37.5 parts of fused potassium acetate (charged in the order given) is heated to 135° C. and diluted with 250 parts of molten naphthalene. 50 parts of purified benzanthrone, m. p. 168–170° C., are then added at 130–135° C. during a period of about 15 minutes, followed by 30 parts of sodium nitrite. The temperature is then raised to the refluxing point (about 215° C.) and held at this value with continued stirring for ¾ hour. After cooling to about 90–100° C., 600 parts of water are added and stirring is continued with aeration until the leuco compound is completely oxidized, after which the naphthalene is distilled off with steam. The residual mass is then filtered, washed with water and dried. A quantitative yield of dyestuff is thus obtained which is practically free of isodibenzanthrone and non-vattable impurity, dissolves in concentrated sulfuric acid with red-violet color, and gives dyeings upon cotton of the shade characteristic of pure dibenzanthrone.

If, in the above examples, fused sodium acetate or fused potassium propionate are used instead of fused potassium acetate, very similar results are obtained.

*Example 3*

250 parts of molten naphthalene are added to a melt of 37.5 parts of methanol, 12.5 parts of fused potassium acetate and 150 parts of caustic potash previously heated to 135–140° C. After adjusting the temperature to 130–135° C., 50 parts of benzanthrone are added during a period of about 15 minutes, followed by 55 parts of potassium nitrite. The temperature is then raised during a period of 1½ to 2 hours to the refluxing point and held 1 hour at 210–215° C. After cooling to about 95° C., the melt is worked up as in Example 2, whereby a product of practically identical quality and yield is obtained.

*Example 4*

A melt of 37.5 parts of methanol, 12.5 parts of fused potassium acetate and 150 parts of caustic potash is heated to 140° C. and diluted with 500 parts of diphenyl oxide previously heated to 100° C. After adjusting the temperature of the mixture to 100° C., 50 parts of benzanthrone and 30 parts of sodium nitrite are added and the temperature raised to 210° C. during about 1½ hours. The temperature is held at 210-220° C. with continued stirring for ¾ hour, and then allowed to drop down to 30° C., with stirring. The melt consists of a granular precipitate suspended in diphenyl oxide, and is worked up by direct filtration. The filter cake is washed free of diphenyl oxide by means of toluol or other light solvent, and the cake is digested in water, aerated, steam distilled free of light solvent, filtered, washed and dried. An almost quantitative yield of dibenzanthrone is thus obtained with exceptional freedom from impurities.

If alpha-methyl-naphthalene is used instead of diphenyl oxide, very similar results are obtained.

*Example 5*

60 parts of molten naphthalene are added to a melt of 9 parts of methanol, 3 parts of fused potassium acetate and 36 parts of caustic potash previously heated to 135° C. 6 parts of Bz2-amino-benzanthrone are then added at a temperature of 130° C., followed by 2.7 parts of sodium nitrite. The temperature is then raised to 200° C. and held at 200-205° C. for ¾ hour with stirring. The melt is then worked up as in Example 2, giving a quantitative yield of dark green powder containing substantially no unvattable impurity. It dyes cotton in green shade and is most probably a pure form of diamino-dibenzanthrone.

It will be understood that many variations and modifications are possible in the preferred procedure above indicated without departing from the spirit of the invention.

Thus, instead of methanol, ethyl alcohol may be used. The proportion of alcohol may be varied somewhat, depending on the kind of alcohol. Generally, a ratio of ⅙ to ⅓ part of alcohol to each part of caustic potash will give satisfactory result, with an optimum at about 1:4. In the case of ethyl alcohol a higher ratio of alcohol to caustic potash is preferable.

The temperature to which the initial melt is heated, before adding diluent, may be varied somewhat, the limits being set only by the lack of fluidity on one hand and the loss of alcohol on the other. Generally this temperature may vary between about 130 to 155° C. The temperature at which the benzanthrone and nitrite may be added is variable between quite wide limits; generally between 100 and 160° C.; but if operating close to the upper limit the nitrite should be added first to avoid partial formation of isodibenzanthrone.

The time required for heating the fusion up to the upper temperature is not critical, as I have found that this may be varied from ¾ to 3 hours without any particular ill effects.

Prolonged heating at the maximum temperature, such as 3 to 4 hours, as specified in some of the earlier types of fusions, is not necessary, as dyestuff formation is usually complete in ¾ to 1 hour after the maximum temperature of the fusion has been reached. The latter may vary between 180 and 230° C., depending on the particular benzanthrone compound being worked with.

Many other variations and modifications are possible without departing from the spirit of this invention.

I am aware of U. S. Patent No. 1,564,423, wherein benzanthrone is first converted to 2,2'-dibenzanthronyl and the latter is isolated and converted into dibenzanthrone or an oxidation derivative thereof either by further caustic fusion in the absence of an oxidizing agent or by oxidizing in acid medium. My novel process differs from the above in several important respects, of which the following two are of major significance. In my improved process no intermediate isolation steps are necessary, and the oxidation is effected in alkaline medium. That 2,2'-dibenzanthronyl could be ring-closed by oxidation in alkaline medium has apparently not been known according to disclosures in the art. On the contrary, as already pointed out above, it was believed in the art that the caustic fusion is favored by the presence of reducing media. I may add further that the final dyestuffs obtainable by my process are of superior purity and tinctorial yield as compared with the dyestuffs when the procedure of said U. S. Patent No. 1,564,423 is followed.

I claim:

1. The process of producing a dibenzanthrone which comprises alkali-fusing a benzanthrone in the presence of a nitrite.

2. The process of producing a dibenzanthrone which comprises fusing a benzanthrone with alcoholic potash in the presence of a salt of nitrous acid.

3. The process of producing a dibenzanthrone which comprises fusing a benzanthrone with alcoholic potash in the presence of an alkali-metal nitrite.

4. The process of producing a dibenzanthrone which comprises fusing a benzanthrone with alcoholic potash in the presence of an alkali-metal nitrite, the alcohol-potash ratio being less than 1 to 3 by weight.

5. The process of producing a dibenzanthrone which comprises fusing a benzanthrone with alcoholic potash in the presence of an alkali-metal nitrite, the amount of alkali-metal nitrite being not less than 1 mole per mole of benzanthrone.

6. The process of producing a dibenzanthrone which comprises fusing a benzanthrone with alcoholic potash in the presence of an alkali-metal nitrite, the amount of alkali-metal nitrite being not less than 1 mole and not more than 4 moles per mole of benzanthrone.

7. The process of producing a dibenzanthrone which comprises fusing a benzanthrone with alcoholic potash in the presence of an alkali-metal nitrite, the alcohol-potash ratio being less than 1 to 3 by weight, and the amount of alkali-metal nitrite being between 1 and 4 moles per mole of benzanthrone.

8. The process of producing a dibenzanthrone which comprises fusing a benzanthrone with alcoholic potash in the presence of an alkali-metal nitrite and an alkali-metal salt of a lower aliphatic acid.

9. A process as in claim 8, the alcohol:potash ratio being less than 1:3 by weight.

10. A process as in claim 8, the alcohol:potash ratio being less than 1:3 by weight, and the amount of alkali-metal nitrite being between 1 and 4 moles per mole of benzanthrone.

11. The process of producing a dibenzanthrone which comprises alkali-fusing a benzanthrone at two stages of temperature, of which the former is lower than the temperature which leads directly to the formation of the corresponding dibenzanthrone, at least one of said stages being carried out in the presence of a metal nitrite.

12. A process for producing dibenzanthrone which comprises heating a melt of benzanthrone in alcoholic potash to a temperature between 100 and 160° C., adding an alkali-metal nitrite, and further heating the mass at a temperature favoring the formation of dibenzanthrone.

13. A process as in claim 12, the quantity of alcohol being less than ⅓ by weight of the quantity of caustic potash.

14. A process as in claim 12, the fusion mass containing further an inert diluent.

15. A process as in claim 12, the fusion mass containing further naphthalene as a diluent.

16. A process as in claim 12, the fusion mass containing further an alkali-metal salt of a lower fatty acid.

17. A process as in claim 12, the fusion mass containing further potassium acetate.

18. A process for producing dibenzanthrone which comprises heating a melt of benzanthrone in alcoholic potash to a temperature between 100 and 160° C., adding an alkali-metal nitrite, and further heating the mass at a temperature between 180 and 230° C.

19. A process for producing dibenzanthrone which comprises preparing a melt comprising benzanthrone, alcohol, caustic potash, an alkali-metal nitrite and an alkali-metal salt of a lower fatty acid at a temperature not below 100° C. and not above 160° C., and heating said melt further to a temperature between 180 and 230° C. until dyestuff formation is substantially complete.

20. A process as in claim 19, the quantity of alcohol being less than ⅓ by weight of the quantity of caustic potash.

21. A process as in claim 19, the melt containing further an inert diluent.

22. A process as in claim 19, the alcohol being present in a ratio not less than ⅙ and not more than ⅓ by weight of the caustic potash.

23. A process as in claim 19, the quantity of alcohol being about ¼ by weight of the quantity of caustic potash.

24. A process as in claim 19, the quantity of alkali-metal nitrite being between 1 and 4 moles per mole of benzanthrone.

25. A process for producing dibenzanthrone which comprises alkali-fusing benzanthrone under conditions favoring the formation of 2,2'-dibenzanthronyl, adding an alkali-metal nitrite, and further fusing the mass at a temperature favoring the formation of dibenzanthrone.

26. A process for producing dibenzanthrone which comprises alkali-fusing a mixture of benzanthrone, alcohol, an alkali-metal salt of a lower fatty acid, and an alkali-metal nitrite under conditions favoring the formation of 2,2'-dibenzanthronyl, and then raising the temperature to the range favoring the formation of dibenzanthrone.

27. In the process of producing dibenzanthrone by alkali-fusing benzanthrone, the step which comprises carrying out at least the latter part of the fusion in the presence of an alkali-metal nitrite.

EDWARD T. HOWELL.